United States Patent
Michael et al.

(10) Patent No.: US 9,913,359 B1
(45) Date of Patent: Mar. 6, 2018

(54) KRYPTON-85-FREE SPARK GAP WITH CANTILEVERED COMPONENT

(71) Applicant: General Electric Company, Schenectady, NY (US)

(72) Inventors: Joseph Darryl Michael, Schenectady, NY (US); Timothy John Sommerer, Ballston Spa, NY (US); Karim Younsi, Ballston Lake, NY (US); Mohamed Rahmane, Ballston Lake, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/400,736

(22) Filed: Jan. 6, 2017

Related U.S. Application Data

(60) Provisional application No. 62/376,306, filed on Aug. 17, 2016.

(51) Int. Cl.
  *H01T 19/00* (2006.01)
  *H05H 1/52* (2006.01)
  *H01T 1/20* (2006.01)
  *F02P 23/04* (2006.01)

(52) U.S. Cl.
  CPC .............. *H05H 1/52* (2013.01); *F02P 23/04* (2013.01); *H01T 1/20* (2013.01); *H01T 19/00* (2013.01)

(58) Field of Classification Search
  CPC ....... H01T 13/465; H01T 13/50; H01T 13/52; H01T 13/54; H01T 14/00; H01T 15/00; H01T 19/00; H01T 4/10; H01T 9/00; H01S 3/0384; H01S 3/0385; G01Q 60/38; G01Q 60/40; G01Q 70/12; H03K 3/537
  See application file for complete search history.

(56) References Cited

U.S. PATENT DOCUMENTS

| | | | |
|---|---|---|---|
| 2,415,816 A | 2/1947 | Depew et al. | |
| 3,149,620 A | 9/1964 | Cataldo | |
| 3,783,589 A | 1/1974 | Ertl et al. | |
| 3,974,412 A | 8/1976 | Pratt, Jr. | |
| 5,367,871 A * | 11/1994 | Venkataramani | ....... F02C 7/264 |
| | | | 219/121.5 |

(Continued)

FOREIGN PATENT DOCUMENTS

EP    1858129 A2    11/2007

OTHER PUBLICATIONS

Sugimoto, Toshiyuki, et al.; "Corona and spark discharges occurring between a grounded sphere and an array of charged multiple electrodes", IEEE Transactions on Industry Applications, vol. 42, Issue: 3, pp. 881-886, May-Jun. 2006.

(Continued)

*Primary Examiner* — Haissa Philogene
(74) *Attorney, Agent, or Firm* — Nitin N. Joshi

(57) ABSTRACT

Embodiments of the present disclosure relate to a spark gap device that includes a first electrode having a first surface and a second electrode having a second surface offset from and facing the first surface. The spark gap device also includes a cantilevered component coupled to the first electrode that is configured to generate a field emission, a corona discharge or both, to emit light toward at least the first surface such that photons are incident on the first surface and cause electron emission from the first surface. The spark gap device may not include a radioactive component.

20 Claims, 4 Drawing Sheets

(56) References Cited

U.S. PATENT DOCUMENTS

| | | | |
|---|---|---|---|
| 5,407,639 A | 4/1995 | Watanabe et al. | |
| 6,630,771 B1 | 10/2003 | Ulm et al. | |
| 7,545,619 B2 * | 6/2009 | Durth | H01T 4/10 |
| | | | 361/117 |
| 8,169,145 B2 * | 5/2012 | Boy | H01T 4/12 |
| | | | 313/231.11 |
| 8,471,449 B2 | 6/2013 | Niessner et al. | |
| 8,776,751 B2 | 7/2014 | Hampton et al. | |
| 9,399,954 B2 * | 7/2016 | Wright | F02C 7/266 |
| 9,546,788 B2 * | 1/2017 | Strong | F23N 5/123 |
| 2006/0055310 A1 | 3/2006 | Vink et al. | |

OTHER PUBLICATIONS

Frey, W., et al.; "Gas-Insulated Self-Breakdown Spark Gaps: Aspects on Low-Scattering and Long-Lifetime Switching", Proceedings of the 2nd Euro-Asian Pulsed Power Conference, vol. 115, Issue: 6, pp. 1016-1018, 2009, Vilnius, Lithuania.

* cited by examiner

KRYPTON-85-FREE SPARK GAP WITH CANTILEVERED COMPONENT

CROSS-REFERENCE TO RELATED APPLICATIONS

This application claims the benefit and priority of U.S. Provisional Patent Application Ser. No. 62/376,306, entitled "KRYPTON85-FREE SPARK GAP USING FIELD-EMISSION OR CORONA DISCHARGE," filed Aug. 17, 2016, which is herein incorporated by reference in its entirety.

BACKGROUND

The subject matter disclosed herein relates to spark gaps for use in ignition systems or other suitable systems.

Spark gaps are passive, two-terminal switches that are open when the voltage across the terminals is low, and then close when the voltage across the terminals exceeds a design value (e.g., 3 kV). The spark gap then re-opens when the current has fallen to a low level or when most of the energy from the voltage source is dissipated. Internally, the current is carried between two metal electrodes that are separated by a small 'gap' (~mm) that is filled with a gas or gas mixture (e.g., Ar—$H_2$—Kr) near atmospheric pressure. The gas is ordinarily insulating, but it becomes a conducting plasma 'spark' when the voltage between the two electrodes exceeds the design value which corresponds to the breakdown voltage.

For various applications, one parameter of interest may be the time between when a sufficient voltage is applied to the spark gap and the time at which it becomes conducting. This time corresponds to the 'breakdown' processes that initiate the transition of the gas from an insulator to a conductor.

There is an idealized but useful view of electrical breakdown as a two-step process—a 'statistical' time for the first electron to appear, followed by a 'formative' time for the electrons to 'avalanche' to a highly conductive state. A free electron appears at some time and location in the gap, and is accelerated by the electric field that is created by the potential difference between the electrodes. Once the electron gains sufficient energy there is some probability for it to ionize a gas atom or molecule and release a second free electron. Each electron is then accelerated and the process repeats, leading to an electron avalanche that makes the gas highly conducting. The energy gain and multiplication processes must overcome various energy and particle loss processes, and the first free electron should be created in preferred locations (e.g., at or near the negative electrode) for maximum effectiveness.

The time required for the second (avalanching) process is the 'formative time lag'. It is generally short and can be practically ignored. Thus, the time required for the first process (the initial electron) is the 'statistical time lag', and it is this 'first electron problem' that is of primary interest in practice. In some devices such as laboratory apparatus or large electric discharge lamps the 'first electron problem' is solved by doing nothing more than waiting for a cosmic ray to create a free electron when it collides with a gas atom, gas molecule, or surface within the device. Electron-ion pairs are always being created at a given rate in atmospheric air by energetic cosmic rays that can easily penetrate into gas volumes within devices and structures. A Geiger counter is an example of a device that detects such events.

However, the ubiquitous cosmic-ray process cannot be relied upon to create effective free electrons within a required timeframe that may be needed for reliable operation of many devices that incorporate a spark gap. In particular, for device employing a spark gap the timeframe is typically too short to rely on a cosmic ray based process because the interaction volume (the region between the electrodes) is relatively small.

Instead, the conventional approach to solving the first-electron problem in a spark gap context (as well as in other devices dealing with similar issues, such as small electric discharge lamps) is to add a source of radioactivity, for example in the form of radioactive krypton-85 (e.g., $^{85}Kr$), which undergoes beta decay to emit an energetic (687 keV) electron, to generate seed electrons and reduce statistical time-lag to acceptable values. Other radioactive materials such as tritium or thorium are sometimes used. The addition of a radioactive component is sometimes referred to as 'radioactive prompting'.

However, radioactive materials, even at trace level, are generally not desirable in a component or product because these materials add to of the cost of manufacturing, handling, and shipping.

BRIEF DESCRIPTION

In one embodiment, a spark gap device includes a first electrode having a first surface, a second electrode having a second surface offset from and facing the first surface, and a cantilevered component coupled to a third surface of the first electrode, where the cantilevered component is configured to generate a field emission, a corona discharge, or both, to emit light toward at least the first surface such that photons emitted by the field emission, the corona discharge, or both when the spark gap is operated are incident on the first surface and cause electron emission from the first surface.

In another embodiment, an ignition device includes one or more igniters configured to ignite a fuel stream or vapor during operation and one or more exciter components, each connected to a respective igniter, where each exciter component includes a spark gap having a cantilevered component configured to generate a field emission, a corona discharge, or both when the spark gap is operated.

In still further embodiments, a method for generating a conductive plasma includes applying a voltage across a spark gap that includes a first electrode and a second electrode, where the first electrode includes a surface facing the second electrode, and where a cantilevered component is coupled to the first electrode, generating free electrons at a tip portion of the cantilevered component via a field emission, a corona discharge, or both, and subsequent to generating the free electrons, generating the conductive plasma across the spark gap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present approach relates to spark gaps, such as those used in ignition systems for combustion engines, as well as in other contexts such as surge protection, power switching, and so forth.

Figure 1:
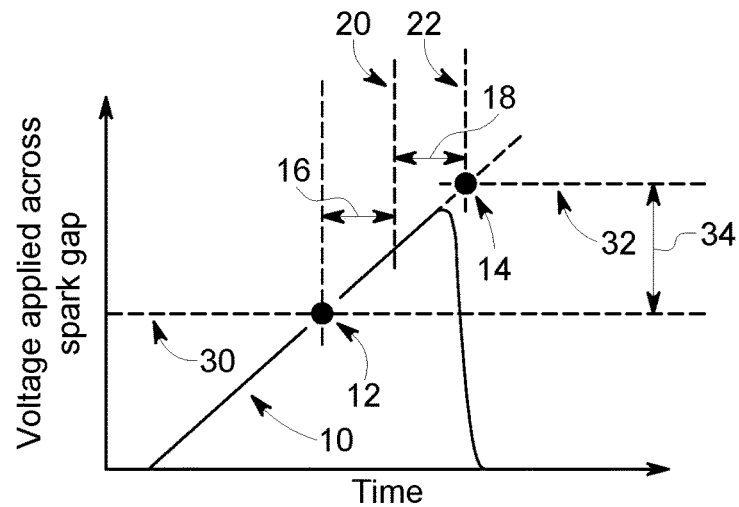
FIG. 1 depicts voltage with respect to time in spark gap operation so as to illustrate concepts related to the present approach.

By way of introduction to the concepts and terminology used herein, an illustrative example of the operation of a spark gap is illustrated in FIG. 1. In this example, if the voltage waveform 10 is a ramp, the rate of voltage rise is 6 kV/s, and the desired voltage rating is 3±0.05 kV, then the total time from Point 12 (the time sufficient voltage for the spark gap to fire is reached) to Point 14 (the time when the spark gap is closed) should be no more than 17 ms. This time corresponds to the 'breakdown' processes that initiate the transition of the gas from an insulator to a conductor.

As can be appreciated from FIG. 1, the breakdown voltage 32 depends on the intrinsic properties of the spark-gap, as well as the voltage ramp 10 that is defined by other portions of the circuit. If the rate of voltage rise is slower, then the voltage-rise between Point 12 and Point 14 is reduced, so Point 12 is sometimes referred to as the 'intrinsic' breakdown voltage of the spark gap, because it does not depend on the circuit properties.

As noted above, an idealized but useful view of electrical breakdown is to view it as a two-step process, with a first component corresponding to a 'statistical' time 16 for the first electron to appear (at time 20), followed by a second component corresponding to a 'formative' time 18 for the electrons to 'avalanche' to a highly conductive state, occurring at time 22 when the spark gap closes. In this example, the difference between the voltage 30 sufficient for the spark gap to fire and the voltage 32 at which the spark gap closes is the variation 34 in gap voltage.

In terms of the underlying concept, a free electron appears at some time and location in the gas surrounding the spark gap, and is accelerated by the electric field that is created by the potential difference between the electrodes. Once it gains sufficient energy there is some probability for it to ionize a gas atom or molecule and release a second free electron. Each electron is then accelerated and the process repeats, leading to an electron avalanche that makes the gas highly conducting. The energy gain and multiplication processes must overcome various energy and particle loss processes, and first electrons are preferably created in certain locations (e.g., near the negative electrode or cathode) for maximum effectiveness.

As noted above, the time 16 required for the first process (i.e., the release of the initial electron) is referred to as the 'statistical time lag', and it is this 'first electron problem' that is addressed in the present approach. The present approach solves the first-electron problem in the spark gap (i.e., the statistical time lag) without relying on the traditional approach of providing a source of ionizing radiation (e.g., $^{85}$Kr), which is generally undesirable, and thus does not employ 'radioactive prompting'. Similarly, the present approach does not rely solely on the effects of cosmic-rays, for generation of the initial electrons as such rays typically are insufficient to generate first electrons at a sufficient rate needed in a spark gap ignition context (or other industrial or mechanical context).

With the preceding introduction in mind, in the present approach $^{85}$Kr is eliminated from the spark gap and a photo-electric effect is instead employed to generate seed electrons. By way of example, in one implementation, a light source (e.g., a field emitter and/or a corona discharge) is employed that emits light (e.g., light energy) at a specific nominal wave length (or range of wavelengths) at a specific level of emitted flux.

In the photo-electric process the absorption of a photon by a material causes the material to emit an electron. The energy of the photon must exceed the work-function of the material. The work-function of materials is typically in the range 2-6 electron-volts. The energy $\epsilon$ of a photon is related to its wavelength $\lambda$ through the expression $\epsilon=hc/\lambda$, where h is Planck's constant, c is the speed of light. In practical units $\epsilon=1240/\lambda$, where $\epsilon$ is in units of electron-volts and is $\lambda$ in units of nanometers. To be effective for photoelectron emission the wavelength of light should, therefore, be shorter than a certain value in the range 200-600 nanometers, corresponding to 2-6 electron-volts, with the exact value depending on the specific material.

While the present embodiments focus on a spark gap that includes a light source or emission inside of an envelope (e.g., housing) of the spark gap, in some embodiments, the light source or emission may be outside of the envelope of the spark gap. In such embodiments, the spectral transmission of the envelope should be considered. By way of example, borosilicate glass absorbs strongly at wavelengths less than 300 nanometers, corresponding to an energy of 4 electron-volts. So if, by way of example, a given material has a work-function of 3 electron-volts, and a light source is placed outside the glass envelope to create photoelectrons, then only photons of energy 3-4 electron volts (300-400 nanometers) will be effective. Photons with wavelength longer than 400 nanometers will not have sufficient energy to cause photoemission, and photons with wavelength shorter than 300 nanometers will be absorbed by the glass. Thus, the material to be photo-electrically stimulated, the wavelength of light to be employed, and the transmissive properties of the envelope are all factors to be considered in the design and configuration of a spark gap system as discussed herein.

With the preceding in mind, the light source (e.g., a field emitter and/or a corona discharge) is located with respect to one of the electrodes (e.g., the cathode or the anode) of a spark gap and the emitted photons incident on the surface of the electrode cause it to emit electrons via the photo-electric effect. These electrons are then available to initiate the gas discharge or breakdown event. In accordance with some implementations, the electrode on which photons from the light source are incident and which emits electrons is a conventional electrode (e.g., a conventional conductive metal substrate and surface), as opposed to an electrode having a coated surface or other emissive coating (e.g., a special purpose emissive coating) and in contrast to a photoelectrode (e.g., a photocathode or other an annular electrode or coil having a coating or composition specifically for the purpose of emitting electrons in response to light photons). However, in other embodiments, electrodes having a coated surface and/or photoelectrodes may be utilized.

Figure 2:
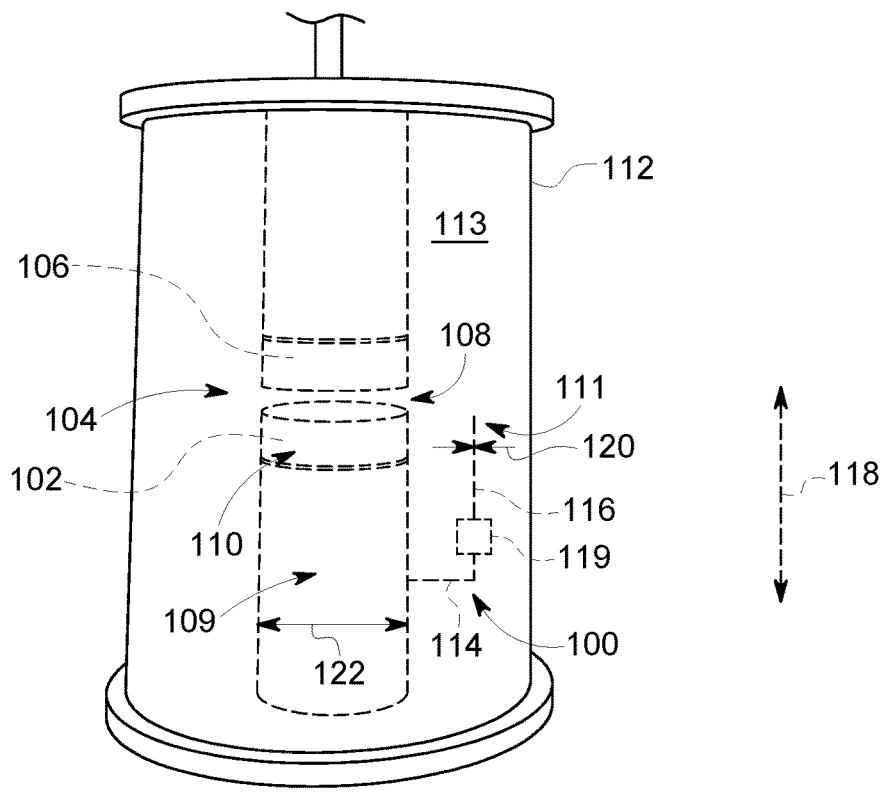
FIG. 2 depicts a spark gap having a cantilevered component configured to emit light via a field emission, a corona discharge, or both, in accordance with aspects of the present disclosure.

Embodiments of the present disclosure relate to a spark gap that utilizes a field emission and/or a corona discharge to generate the photo-electric effect, which eliminates the need for $^{85}$Kr in the spark gap. For example, FIG. 2 is a perspective view of a cantilevered component 100 (e.g., a component capable of producing a field emission and/or a corona discharge) coupled to a first electrode 102 (e.g., an anode or a cathode) of a spark gap 104. The spark gap 104 may also include a second electrode 106 (e.g., an anode or cathode) disposed proximate the first electrode 102 to form a gap 108 between the first electrode 102 and the second electrode 106. In some embodiments, the cantilevered component 100 may be coupled to the first electrode 102 by a weld. In other embodiments, the cantilevered component 100 may be coupled to the first electrode 102 using another suitable technique (e.g., a fastener, an adhesive, or otherwise mechanically coupled to the first electrode 102). Additionally, as shown in the illustrated embodiment of FIG. 2, the cantilevered component 100 may be coupled to a body portion 109 (e.g., on a surface not facing the second electrode 106) of the first electrode 102 as opposed to an active portion 110 of the first electrode 102 (e.g., a portion of the first electrode 102 that establishes a connection with the second electrode 106). However, in other embodiments, the cantilevered component 100 may be coupled to the active portion 110. In any case, the body portion 109 of the first electrode 102 may be electrically coupled to the active portion 110 of the first electrode 102.

In some embodiments, the cantilevered component 100 may receive a high-voltage, which may form a high intensity electric field at a tip portion 111 of the cantilevered component 100. The high intensity electric field at the tip portion 111 may create a field emission (e.g., by providing seed electrons above a threshold amount) and/or a corona discharge within an envelope 112 (e.g., a housing) of the spark gap 104. The field emission and/or corona discharge may cause a breakdown in the gap 108, thereby causing the spark gap 104 to close. More specifically, in some embodiments, the voltage supplied to the tip portion 111 may reach a value sufficient for a field emission to occur, electrons emitted from the tip portion 111 due to the field emission may then ionize a gas mixture 113 present in the envelope to form a corona discharge. The corona discharge may, in turn, create photons that strike a surface of the first electrode 102 and/or the second electrode 106, thereby releasing photo electrons and initiating a plasma and/or spark in the gap 108. Therefore, in some embodiments, the envelope 112 may be filled with the gas mixture 113 that may ultimately lead to breakdown in the spark gap 104.

The cantilevered component 100 may be configured to form a field emission and/or a corona discharge at the tip portion 111, rather than at another location along the cantilevered component. Accordingly, a threshold electric field for a field emission and/or a corona discharge should be reached at the tip portion 111 before another point along the cantilevered component. Generally the threshold electric field is reduced at the tip portion 111 when compared to other locations along the cantilevered component 100 because the electric field is concentrated at the tip portion 111. Conversely, the electric field is spread out along other locations of the cantilevered component 100 (e.g., a cylindrical wire). In some cases, it may be desirable to prevent a field emission and/or a corona discharge at a point along the cantilevered component 100 other than the tip portion 111. Therefore, the cantilevered component 100 may be disposed within the spark gap 104 so that the tip portion 111 of the cantilevered component 100 is positioned nearest the first electrode 102 when compared to other locations along the cantilevered component 100.

In some embodiments, the tip portion 111 may include a relatively small radius and be positioned at a distance sufficient to block the field emission and/or the corona discharge from reaching the first electrode 102 and/or the second electrode 106. For example, a ratio of the distance from the tip portion 111 and the first electrode 102 (e.g., d) and the radius of the tip portion 111 (e.g., r) may be less than 7, less than 6, or less than 5.85 to ensure that a corona discharge will occur without reaching the first electrode 102 and/or the second electrode 106.

As shown in the illustrated embodiment of FIG. 2, the cantilevered component 100 may be substantially "L" shaped. Therefore, the cantilevered component 100 may include a first portion 114 (e.g., a cantilevered portion) extending radially outward from the first electrode 102 (e.g., cathode) and a second portion 116 extending in an axial direction 118 from the first portion 114. However, in other embodiments, the cantilevered component 100 may include any suitable configuration, such that the field emission and/or the corona discharge occur at the tip portion 111 of the cantilevered component 100. In still further embodiments, the cantilevered component 100 may include an electronic component 119 (e.g., a resistor, an inductor, and/or a capacitor) disposed on the first portion 114 and/or the second portion 116. The electronic component 119 may impede an amount of current flowing through the cantilevered component 100 to limit a current of light emitted by the field emission and/or the corona discharge, while maintaining a high intensity electric field at the tip portion 111 of the cantilevered component 100. Accordingly, the electronic component 119 may enable enhanced control of light emitted by the cantilevered component 100.

In any case, the cantilevered component 100 may include a diameter 120 that is substantially less than a diameter 122 of the first electrode 102. In some embodiments, the diameter 120 of the cantilevered component 100 (e.g., at least at the tip portion 111) may be between 0.01% and 20% of the diameter 122 of the first electrode 102, between 0.1% and 10% of the diameter 122 of the first electrode 102, or between 1% and 5% of the diameter 122 of the first electrode 102. Because the tip portion 111 of the cantilevered component 100 includes a relatively small diameter when compared to the diameter 122 of the first electrode 102, the tip portion 111 may be configured to produce the high intensity electric field. For example, the tip portion 111 may include (e.g., receive) the same voltage as the first electrode 102, but because the tip portion 111 includes a substantially smaller cross sectional area, the tip portion 111 may generate a large electric field. Accordingly, the tip portion 111 of the cantilevered component 100 may generate a field emission, a corona discharge, or both, during operation of the spark gap.

Figure 3:
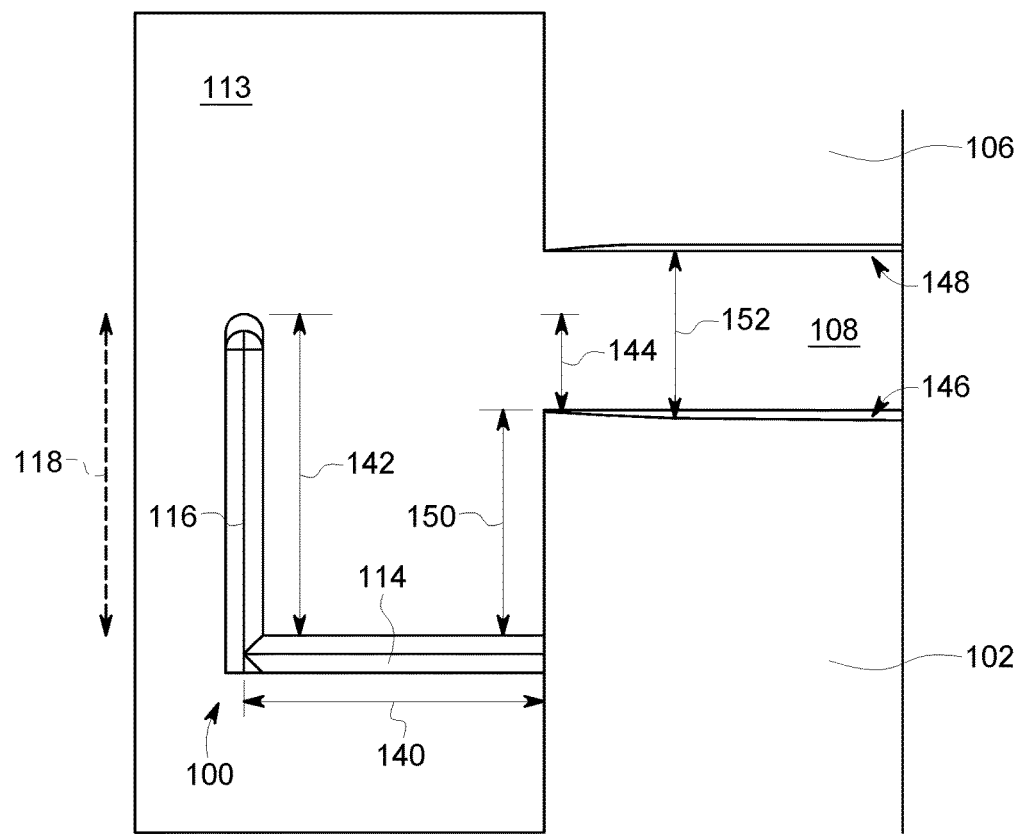
FIG. 3 is a schematic of the cantilevered component of FIG. 2, in accordance with aspects of the present disclosure.

In some embodiments, lengths of the first portion 114 and/or the second portion 116 may determine a performance of the spark gap 104 (e.g., a wavelength, frequency, and/or energy output by the field emission and/or the corona discharge). For example, FIG. 3 is a schematic of the cantilevered component 100 extending from the first electrode 102. As shown in the illustrated embodiment of FIG. 3, the first portion 114 may extend radially outward from the first electrode 102 a distance 140. The second portion 116 may extend in the axial direction 118 a distance 142 from the first portion 114. In some embodiments, the second portion 116 may extend a distance 144 beyond a surface 146 of the first electrode 102 that faces a second surface 148 of the second electrode 106. However, in other embodiments, the second portion 116 may be substantially flush with the surface 146 or be positioned below the surface 146 relative to the axial direction 118. Additionally, the first portion 114 may be coupled to the first electrode 102 a distance 150 from the surface 146.

In some embodiments, the distance 140 may be between 0.5 millimeters (mm) and 10 mm, between 1 mm and 7 mm, between 2 mm and 6 mm, or between 3 mm and 5 mm. In other embodiments, the distance 140 may be approximately (e.g., within 5% or within 10% of) 4 mm. Similarly, in some embodiments, the distance 142 may be between 0.5 millimeters (mm) and 10 mm, between 1 mm and 7 mm, between 2 mm and 6 mm, or between 3 mm and 5 mm. In other embodiments, the distance 142 may be approximately (e.g., within 5% or within 10% of) 4 mm. Further, the distance 144 may be between 0.1 mm and 3 mm, between 0.3 mm and 2 mm, or between 0.5 mm and 1.5 mm. Similarly, the distance 150 may be between 0.1 mm and 10 mm, between 1 mm and 8 mm, or between 2 mm and 4 mm. Further still, in some embodiments, the gap 108 may include a distance 152 between 0.1 mm and 10 mm, between 0.5 mm and 5 mm, or between 1 mm and 3 mm. In other embodiments, the distance 152 may be approximately (e.g., within 5% or within 10% of) 2 mm.

As may be appreciated, the temperature environment where the present approach may be employed may vary. By way of example, in an ignition system for a jet engine the environmental temperature at the exciter component where the spark gap 104 is located may be around 150° C. The operation of the spark-gap does not depend strongly on temperature, and the cantilevered component 100 may produce the field emission, the corona discharge, or both over a relatively wide range of temperatures. For example, the spark gap 104 includes a closed volume, such that the field emission and/or the corona discharge depend on a density of gas in the spark gap 104. Accordingly, pressure in the spark gap 104 may increase as temperature increases due to the field emission and/or corona discharge, but a total number of gas atoms may remain substantially fixed in the closed volume. Therefore, the density of the gas remains substantially constant, and even though temperature increases, the field emission and/or the corona discharge are substantially unaffected.

Figure 4:
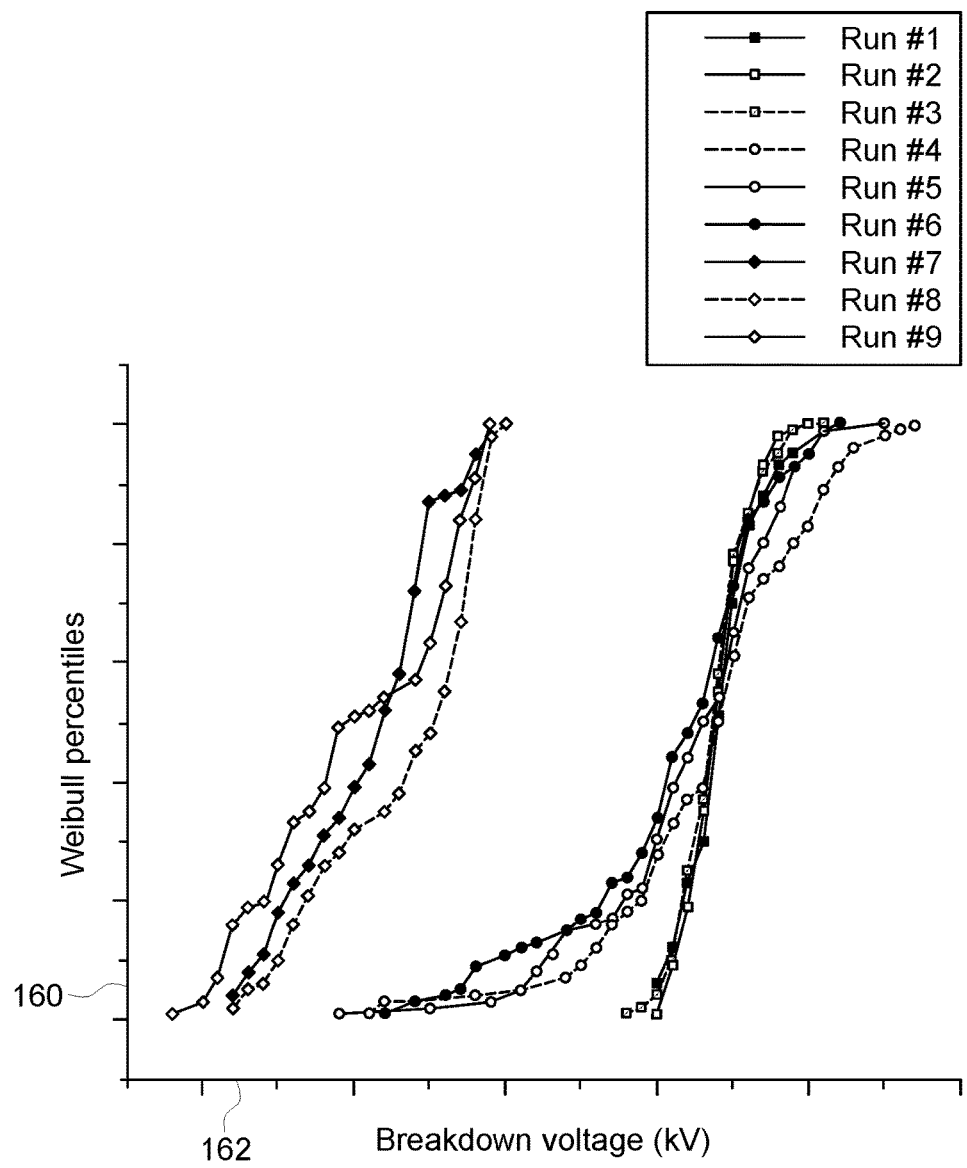
FIG. 4 is a graphical illustration of a performance of spark gaps that include the cantilevered component of FIG. 2 compared to a performance of spark gaps that do not include the cantilevered component, in accordance with aspects of the present disclosure.

FIG. 4 is a graphical illustration of results in terms of breakdown voltage for the spark gap 104 having the cantilevered component 100 when compared to a spark gap that does not include $^{85}$Kr or the cantilevered component 100. As shown in the illustrated embodiment of FIG. 4, three of the spark gaps 104 having the cantilevered component 100 (Runs 7-9) were compared to six spark gaps that did not include either the cantilevered component or $^{85}$Kr (Runs 1-6). Weibull percentiles of each spark gap are shown on a y-axis 160 and breakdown voltage is shown on an x-axis 162. As used herein, Weibull percentiles may refer to a statistical distribution of a variation in breakdown voltage over a variety of samples (e.g., 100 samples) for a given spark gap (e.g., Runs 1-9). As shown in FIG. 4, the spark gaps 104 having the cantilevered component 100 (Runs 7-9) generally included a smaller range of breakdown voltages than the spark gaps without the cantilevered component 100 and/or $^{85}$Kr (Runs 1-6). For example, the spark gaps 104 having the cantilevered component 100 (Runs 7-9) include steeper slopes than the spark gaps without the cantilevered component 100 and/or $^{85}$Kr (Runs 1-6), thereby indicating a smaller breakdown voltage range.

Figure 5:
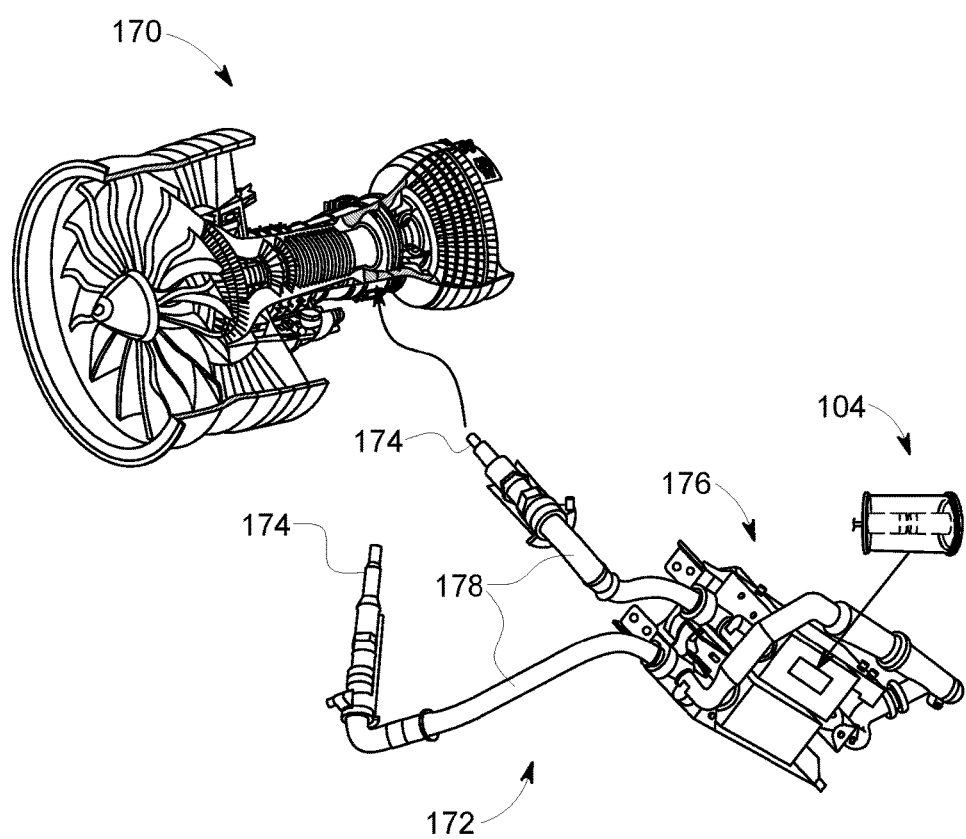
FIG. 5 depicts an engine, here a jet engine, employing ignition components that include a spark gap as discussed herein and in accordance with aspects of the present disclosure.

With the preceding in mind, FIG. 5 depicts an example of an engine 170, here a jet engine, in which the spark gap 104 using the cantilevered component 100 may be employed. For example, the spark gap 104 may be included as part of a fuel ignition system 172 for the engine 170 by which a fuel stream or vapor is combusted. In this example, the spark gap 104 may be provided for one or more igniters 174. For example, each spark gap 104 may be provided as part of an exciter component 176 in communication with a respective igniter 174 via a corresponding lead 178. In this manner, spark events induced at a given spark gap 104 may correspond to a conductive flow between the electrodes of the spark gap 104, causing an ignition event at the corresponding igniter 174 and an ignition event during operation of the engine 170. Though an engine 170 such as that depicted in FIG. 5 is one possible use for a spark gap 104 as discussed herein (e.g., as part of an ignition system), a spark gap 104 as presently disclosed may also be used in other ignition and non-ignition contexts.

Technical effects of the invention include an alternative approach to generating seed electrons at a spark gap, allowing $^{85}$Kr to be eliminated from the gas mixture typically present at the spark gap while maintaining the same performance and function of the device. The present approach utilizes the photo-electric effect, using a cantilevered component coupled to an electrode to generate light energy with a specific nominal wave length (or range of wavelengths) at a specific level of emitted flux to generate seed electrons. The light source (e.g., a cantilevered component coupled to an electrode that generates a field emission and/or a corona discharge) is located with respect to one of the electrodes (e.g., the cathode) of a spark gap and the emitted photons landing incident on the surface of the electrode causes it to emit electrons needed to initiate the gas discharge or breakdown event. The present approach may be retrofit in existing packaging, such that there would be no major changes in the manufacturing of the spark gap 104 or the remainder of the ignition system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A spark gap device, comprising:
   a first electrode having a first surface;
   a second electrode having a second surface offset from and facing the first surface; and
   a cantilevered component coupled to a third surface of the first electrode, wherein the cantilevered component is configured to generate a field emission, a corona discharge, or both to emit light toward at least the first surface such that photons emitted by the field emission, the corona discharge, or both when the spark gap is operated are incident on the first surface and cause electron emission from the first surface.

2. The spark gap device of claim 1, wherein the cantilevered component comprises an "L" shape having a first portion and a second portion.

3. The spark gap device of claim 2, wherein the first portion extends radially outward from the first electrode a first distance, and wherein the second portion extends axially from the first portion a second distance.

4. The spark gap device of claim 3, wherein the first distance is between 3 millimeters (mm) and 5 mm.

5. The spark gap device of claim 3, wherein the second distance is between 3 millimeters (mm) and 5 mm.

6. The spark gap device of claim 2, wherein the second portion extends past a surface of the first electrode.

7. The spark gap device of claim 1, wherein the cantilevered component comprises a first diameter that is between 1% and 5% of a second diameter of the first electrode.

8. The spark gap device of claim 1, wherein the first electrode comprises a cathode and the second electrode comprises an anode.

9. The spark gap device of claim 1, wherein the spark gap device does not include a radioactive component.

10. The spark gap device of claim 1, wherein the cantilevered component is configured to emit the field emission, the corona discharge, or both to emit the light toward the second surface.

11. An ignition device, comprising:
    one or more igniters configured to ignite a fuel stream or vapor during operation; and
    one or more exciter components, each connected to a respective igniter, wherein each exciter component comprises a spark gap having a cantilevered component configured to generate a field emission, a corona discharge, or both when the spark gap is operated.

12. The ignition device of claim 11, wherein the spark gap comprises:
    a first electrode having a first surface; and
    a second electrode having a second surface offset from and facing the first surface, wherein the cantilevered component is coupled to a third surface of the first electrode.

13. The ignition device of claim 12, wherein the first electrode is a cathode and the second electrode is an anode.

14. The ignition device of claim 12, wherein the cantilevered component comprises a first diameter that is between 1% and 5% of a second diameter of the first electrode.

15. The ignition device of claim 12, wherein the cantilevered component comprises an "L" shape having a first portion and a second portion.

16. The spark gap device of claim 15, wherein the first portion extends radially outward from the first electrode a first distance, and wherein the second portion extends axially from the first portion a second distance.

17. The ignition device of claim 11, wherein the cantilevered component is disposed within a housing of the spark gap.

18. A method for generating a conductive plasma, comprising:
    applying a voltage across a spark gap comprising a first electrode and a second electrode, wherein the first electrode comprises a surface facing the second electrode, and wherein a cantilevered component is coupled to the first electrode;
    generating free electrons at a tip portion of the cantilevered component via a field emission, a corona discharge, or both; and
    subsequent to generating the free electrons, generating the conductive plasma across the spark gap.

19. The method of claim 18, wherein free electrons are not generated by a radioactive isotope.

20. The method of claim 18, wherein generating the free electrons at the tip portion of the cantilevered component via the field emission, the corona discharge, or both, comprises generating a high intensity electric field at the tip portion.

* * * * *